US008532206B2

(12) United States Patent
Shin

(10) Patent No.: US 8,532,206 B2
(45) Date of Patent: Sep. 10, 2013

(54) METHOD AND APPARATUS FOR CREATING FRAME OF ORTHOGONAL FREQUENCY DIVISION MULTIPLEXING (OFDM) SPECIFICATION USING FREQUENCY DOMAIN SPREADING

(75) Inventor: Cheol Ho Shin, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 329 days.

(21) Appl. No.: 12/987,564

(22) Filed: Jan. 10, 2011

(65) Prior Publication Data

US 2012/0051400 A1    Mar. 1, 2012

(30) Foreign Application Priority Data

Aug. 25, 2010  (KR) .................. 10-2010-0082433

(51) Int. Cl.
*H04K 1/10* (2006.01)
(52) U.S. Cl.
USPC ........................................................ 375/260
(58) Field of Classification Search
USPC ........................................................ 375/260
See application file for complete search history.

(56) References Cited

U.S. PATENT DOCUMENTS

| 2006/0268671 | A1* | 11/2006 | Coon | ............................ 370/203 |
| 2008/0225982 | A1 | 9/2008 | Chrabieh et al. | |
| 2010/0278111 | A1* | 11/2010 | Kashima et al. | ............... 370/328 |
| 2011/0134900 | A1* | 6/2011 | Liu et al. | ........................ 370/338 |
| 2011/0188518 | A1* | 8/2011 | Kenney et al. | ................ 370/476 |

FOREIGN PATENT DOCUMENTS

| KR | 10-2006-0093224 | 8/2006 |
| KR | 10-2009-0083957 | 8/2009 |

OTHER PUBLICATIONS

Brown, "Preliminary draft P802.15.4g-d0.2", Mar. 11, 2010.*
Choi, A proposal of Comment resolutions for Interleaver and Pad bits in OFDM Group, Jul. 2010.*
Kojima, "Study on Multipath Characteristics for IEEE 802.15.4g SUN Applications in the Frequency Band Used in Japan", 2010 IEEE International Conference on Communications Workshops (ICC), Publication May 23, 2010, pp. 1-5.*
Anuj Batra et al., "Design of a Multiband OFDM system for Realistic UWB Channel Environments", IEEE Transactions on Microwave theory and Techniques, vol. 52, No. 9, pp. 2123-2138, Sep. 2004.
Rabih Chrabieh et al., "Enhanced Frequency Domain Spreading for Wimedia UWB", ISICT'07 International Symposium, pp. 1247-1251, 2007.
IEEE P802.15, Wireless Personal Area Networks, Document No. IEEE 15-10- 0423-00-004g, filed by the inventor on Jun. 24, 2010.

* cited by examiner

*Primary Examiner* — Juan A Torres
(74) *Attorney, Agent, or Firm* — Staas & Halsey LLP

(57) ABSTRACT

A method and an apparatus for creating a frame of an orthogonal frequency division multiplexing (OFDM) specification using a frequency domain spreading (FDS). The method and the apparatus determine a number of padding bits based on various FDSs and a size of an interleaver and constitute a frame including a determined number of padding bits, so that there is provided a frame which is adequate for a data transmission rate using various FDSs and which includes a minimal number of redundant OFDM symbol.

13 Claims, 11 Drawing Sheets

FIG. 1
(PRIOR ART)

| Parameter | OFDM Option 1 | OFDM Option 2 | OFDM Option 3 | OFDM Option 4 | OFDM Option 5 | Unit |
|---|---|---|---|---|---|---|
| FFT size | 128 | 64 | 32 | 16 | 8 | |
| Active tone | 104 | 52 | 26 | 14 | 6 | |
| # Pilot tones | 8 | 4 | 2 | 2 | 2 | |
| # Data tones | 96 | 48 | 24 | 12 | 4 | |
| MCS0 (BPSK transmission rate (rate) 1/2, 4x frequency repetition) | 100 | 50 | | | | kbps |
| MCS1 (BPSK transmission rate 1/2, 2x frequency repetition) | 200 | 100 | 50 | | | kbps |
| MCS2 (QPSK transmission rate 1/2, 2x frequency repetition) | 400 | 200 | 100 | 50 | | kbps |
| MCS3 (DCM QPSK transmission rate 1/2) | 800 | 400 | 200 | 100 | | kbps |
| MCS4 (QPSK transmission rate 1/2) | 800 | 400 | 200 | 100 | | kbps |
| MCS5 (DCM QPSK transmission rate 3/4) | | 600 | 300 | 150 | 50 | kbps |
| MCS6 (QPSK transmission rate 3/4) | | 600 | 300 | 150 | 50 | kbps |
| MCS7 (16-QAM transmission rate 1/2) | | 800 | 400 | 200 | 66 and 2/3 | kbps |
| MCS8 (16-QAM transmission rate 3/4) | | | 600 | 300 | 100 | kbps |

FIG. 4

| Option | Data transmission rate (Kbps) | Modulation | Coding rate (R) | FDS ($N_F$) | $N_{CBPS}$ | $N_{DBPS}$ | $N_{PAD}$ | $N_{SYM}$ |
|---|---|---|---|---|---|---|---|---|
| 1 | 100 | BPSK | 0.5 | 4 | 24 | 12 | 6 | 3 |
|   | 200 | BPSK | 0.5 | 2 | 48 | 24 | 18 | 2 |
|   | 400 | QPSK | 0.5 | 2 | 96 | 48 | 18 | 1 |
|   | 800 | DCM | 0.5 | 1 | 192 | 96 | 66 | 1 |
|   | 800 | QPSK | 0.5 | 1 | 192 | 96 | 66 | 1 |
| 2 | 50 | BPSK | 0.5 | 4 | 12 | 6 | 0 | 5 |
|   | 100 | BPSK | 0.5 | 2 | 24 | 12 | 6 | 3 |
|   | 200 | QPSK | 0.5 | 2 | 48 | 24 | 18 | 2 |
|   | 400 | DCM | 0.5 | 1 | 96 | 48 | 18 | 1 |
|   | 400 | QPSK | 0.5 | 1 | 96 | 48 | 18 | 1 |
|   | 600 | DCM | 0.75 | 1 | 96 | 72 | 42 | 1 |
|   | 600 | QPSK | 0.75 | 1 | 96 | 72 | 42 | 1 |
|   | 800 | 16-QAM | 0.5 | 1 | 192 | 96 | 66 | 1 |
| 3 | 50 | BPSK | 0.5 | 2 | 12 | 6 | 0 | 5 |
|   | 100 | QPSK | 0.5 | 2 | 24 | 12 | 6 | 3 |
|   | 200 | DCM | 0.5 | 1 | 48 | 24 | 18 | 2 |
|   | 200 | QPSK | 0.5 | 1 | 48 | 24 | 18 | 2 |
|   | 300 | DCM | 0.75 | 1 | 48 | 36 | 6 | 1 |
|   | 300 | QPSK | 0.75 | 1 | 48 | 36 | 6 | 1 |
|   | 400 | 16-QAM | 0.5 | 1 | 96 | 48 | 18 | 1 |
|   | 600 | 16-QAM | 0.75 | 1 | 96 | 72 | 42 | 1 |
| 4 | 50 | QPSK | 0.5 | 2 | 12 | 6 | 0 | 5 |
|   | 100 | DCM | 0.5 | 1 | 24 | 12 | 6 | 3 |
|   | 100 | QPSK | 0.5 | 1 | 24 | 12 | 6 | 3 |
|   | 150 | DCM | 0.75 | 1 | 24 | 18 | 6 | 2 |
|   | 150 | QPSK | 0.75 | 1 | 24 | 18 | 6 | 2 |
|   | 200 | 16-QAM | 0.5 | 1 | 48 | 24 | 18 | 2 |
|   | 300 | 16-QAM | 0.75 | 1 | 48 | 36 | 6 | 1 |
| 5 | 50 | DCM | 0.75 | 1 | 8 | 6 | 0 | 5 |
|   | 50 | QPSK | 0.75 | 1 | 8 | 6 | 0 | 5 |
|   | 66 | 16-QAM | 0.5 | 1 | 16 | 8 | 2 | 4 |
|   | 100 | 16-QAM | 0.75 | 1 | 16 | 12 | 6 | 3 |

FIG. 8

| Option | Data transmission rate (Kbps) | Modulation | Coding rate (R) | FDS ($N_F$) | $N_{cbps}$ | $N_{CBPS}$ | $N_{DBPS}$ | $N_{PAD}$ | $N_{SYM}$ |
|---|---|---|---|---|---|---|---|---|---|
| 1 | 100 | BPSK | 0.5 | 4 | 96 | 96 | 48 | 18 | 4 |
|   | 200 | BPSK | 0.5 | 2 | 96 | 192 | 96 | 66 | 4 |
|   | 400 | QPSK | 0.5 | 2 | 192 | 384 | 192 | 162 | 4 |
|   | 800 | DCM | 0.5 | 1 | 192 | 768 | 384 | 354 | 4 |
|   | 800 | QPSK | 0.5 | 1 | 192 | 768 | 384 | 354 | 4 |
| 2 | 50 | BPSK | 0.5 | 4 | 48 | 48 | 24 | 18 | 8 |
|   | 100 | BPSK | 0.5 | 2 | 48 | 96 | 48 | 18 | 4 |
|   | 200 | QPSK | 0.5 | 2 | 96 | 192 | 96 | 66 | 4 |
|   | 400 | DCM | 0.5 | 1 | 96 | 384 | 192 | 162 | 4 |
|   | 400 | QPSK | 0.5 | 1 | 96 | 384 | 192 | 162 | 4 |
|   | 600 | DCM | 0.75 | 1 | 96 | 384 | 288 | 258 | 4 |
|   | 600 | QPSK | 0.75 | 1 | 96 | 384 | 288 | 258 | 4 |
|   | 800 | 16-QAM | 0.5 | 1 | 192 | 768 | 384 | 354 | 4 |
| 3 | 50 | BPSK | 0.5 | 2 | 24 | 48 | 24 | 18 | 8 |
|   | 100 | QPSK | 0.5 | 2 | 48 | 96 | 48 | 18 | 4 |
|   | 200 | DCM | 0.5 | 1 | 48 | 192 | 96 | 66 | 4 |
|   | 200 | QPSK | 0.5 | 1 | 48 | 192 | 96 | 66 | 4 |
|   | 300 | DCM | 0.75 | 1 | 48 | 192 | 144 | 114 | 4 |
|   | 300 | QPSK | 0.75 | 1 | 48 | 192 | 144 | 114 | 4 |
|   | 400 | 16-QAM | 0.5 | 1 | 96 | 384 | 192 | 162 | 4 |
|   | 600 | 16-QAM | 0.75 | 1 | 96 | 384 | 288 | 258 | 4 |
| 4 | 50 | QPSK | 0.5 | 2 | 24 | 48 | 24 | 18 | 8 |
|   | 100 | DCM | 0.5 | 1 | 24 | 96 | 48 | 18 | 4 |
|   | 100 | QPSK | 0.5 | 1 | 24 | 96 | 48 | 18 | 4 |
|   | 150 | DCM | 0.75 | 1 | 24 | 96 | 72 | 42 | 4 |
|   | 150 | QPSK | 0.75 | 1 | 24 | 96 | 72 | 42 | 4 |
|   | 200 | 16-QAM | 0.5 | 1 | 48 | 192 | 96 | 66 | 4 |
|   | 300 | 16-QAM | 0.75 | 1 | 48 | 192 | 144 | 114 | 4 |
| 5 | 50 | DCM | 0.75 | 1 | 8 | 32 | 24 | 18 | 8 |
|   | 50 | QPSK | 0.75 | 1 | 8 | 32 | 24 | 18 | 8 |
|   | 66 | 16-QAM | 0.5 | 1 | 16 | 64 | 32 | 2 | 4 |
|   | 100 | 16-QAM | 0.75 | 1 | 16 | 64 | 48 | 18 | 4 |

FIG. 10

| Option | Data transmission rate (Kbps) | Modulation | Coding rate (R) | FDS ($N_F$) | $N_{cbps}$ | $N_{CBPS}$ | $N_{DBPS}$ | $N_{PAD}$ | $N_{SYM}$ |
|---|---|---|---|---|---|---|---|---|---|
| 1 | 100 | BPSK | 0.5 | 4 | 96 | 96 | 48 | 18 | 4 |
|  | 200 | BPSK | 0.5 | 2 | 96 | 96 | 48 | 18 | 2 |
|  | 400 | QPSK | 0.5 | 2 | 192 | 192 | 96 | 66 | 2 |
|  | 800 | DCM | 0.5 | 1 | 192 | 192 | 96 | 66 | 1 |
|  | 800 | QPSK | 0.5 | 1 | 192 | 192 | 96 | 66 | 1 |
| 2 | 50 | BPSK | 0.5 | 4 | 48 | 48 | 24 | 18 | 8 |
|  | 100 | BPSK | 0.5 | 2 | 48 | 48 | 24 | 18 | 4 |
|  | 200 | QPSK | 0.5 | 2 | 96 | 96 | 48 | 18 | 2 |
|  | 400 | DCM | 0.5 | 1 | 96 | 96 | 48 | 18 | 1 |
|  | 400 | QPSK | 0.5 | 1 | 96 | 96 | 48 | 18 | 1 |
|  | 600 | DCM | 0.75 | 1 | 96 | 96 | 72 | 42 | 1 |
|  | 600 | QPSK | 0.75 | 1 | 96 | 96 | 72 | 42 | 1 |
|  | 800 | 16-QAM | 0.5 | 1 | 192 | 192 | 96 | 66 | 1 |
| 3 | 50 | BPSK | 0.5 | 2 | 24 | 24 | 12 | 6 | 6 |
|  | 100 | QPSK | 0.5 | 2 | 48 | 48 | 24 | 18 | 4 |
|  | 200 | DCM | 0.5 | 1 | 48 | 48 | 24 | 18 | 2 |
|  | 200 | QPSK | 0.5 | 1 | 48 | 48 | 24 | 18 | 2 |
|  | 300 | DCM | 0.75 | 1 | 48 | 48 | 36 | 6 | 1 |
|  | 300 | QPSK | 0.75 | 1 | 48 | 48 | 36 | 6 | 1 |
|  | 400 | 16-QAM | 0.5 | 1 | 96 | 96 | 48 | 18 | 1 |
|  | 600 | 16-QAM | 0.75 | 1 | 96 | 96 | 72 | 42 | 1 |
| 4 | 50 | QPSK | 0.5 | 2 | 24 | 24 | 12 | 6 | 6 |
|  | 100 | DCM | 0.5 | 1 | 24 | 24 | 12 | 6 | 3 |
|  | 100 | QPSK | 0.5 | 1 | 24 | 24 | 12 | 6 | 3 |
|  | 150 | DCM | 0.75 | 1 | 24 | 24 | 18 | 6 | 2 |
|  | 150 | QPSK | 0.75 | 1 | 24 | 24 | 18 | 6 | 2 |
|  | 200 | 16-QAM | 0.5 | 1 | 48 | 48 | 24 | 18 | 2 |
|  | 300 | 16-QAM | 0.75 | 1 | 48 | 48 | 36 | 6 | 1 |
| 5 | 50 | DCM | 0.75 | 1 | 8 | 8 | 6 | 0 | 5 |
|  | 50 | QPSK | 0.75 | 1 | 8 | 8 | 6 | 0 | 5 |
|  | 66 | 16-QAM | 0.5 | 1 | 16 | 16 | 8 | 2 | 4 |
|  | 100 | 16-QAM | 0.75 | 1 | 16 | 16 | 12 | 6 | 3 |

METHOD AND APPARATUS FOR CREATING FRAME OF ORTHOGONAL FREQUENCY DIVISION MULTIPLEXING (OFDM) SPECIFICATION USING FREQUENCY DOMAIN SPREADING

CROSS-REFERENCE TO RELATED APPLICATION

This application claims the benefit of Korean Patent Application No. 10-2010-0082433, filed on Aug. 25, 2010, in the Korean Intellectual Property Office, the disclosure of which is incorporated herein by reference.

BACKGROUND

1. Field of the Invention

The present invention relates to a method and an apparatus for creating a frame of an orthogonal frequency division multiplexing (OFDM) specification, and more particularly, to a method and an apparatus for creating a frame of an OFDM specification using frequency domain spreading.

2. Description of the Related Art

Physical layer (PHY) specifications for the Smart Utility Network to facilitate metering electricity, gas, and water wirelessly are standardized based on the Institute of Electrical and Electronics Engineers (IEEE) 802.15.4g.

An orthogonal frequency division multiplexing (OFDM) transmission scheme performing the standardization on the IEEE 802.15.4g provides an interleaving structure to maximize effects of frequency domain spreading (FDS) and channel coding for a high link margin. Since there is a close relation between a size of the interleaving structure and the FDS in forming a frame, it is difficult to form the frame when the relation between the size of the interleaving structure and the FDS is not clearly defined.

Embodiments of the present invention disclose frame forming methods generally applied to various options depending on a size of a fast Fourier transform (FFT) of the OFDM defined in the IEEE 802.15.4g specification.

Installation of a smart grid, an intelligent electricity network, actively encouraged to as a strategic project by countries in the world, is intended to reduce costs through efficient energy management and to reduce carbon emission produce through production of renewable energy. Advanced countries, such as the USA and European countries, have implemented various IT-based electric power network projects since early 2000, and the Korean government also launched a national project and program in 2009.

The IEEE 802.15.4g Task Group receives a suggestion and standardizes the SUN PHY specifications, a wireless electricity metering system, used in a wireless network of the smart grid since May in 2009. The suggested technology will be developed into a wireless system specializing in the wireless network of the smart grid to provide a high link margin so that a low-power design is realized and inadequate surroundings for radio signals are overcome.

The embodiments of the present invention suggest frame forming methods based on FDS and a size of an interleaving structure designed to provide a high link margin so that a low-power design is realized and inadequate surroundings for radio signals are overcome, which are required by the IEEE 802.15.4g SUN specification group. The methods are distinguished from conventional system forming methods proposed for OFDM system specifications developed ignoring FDS characteristics.

SUMMARY

An aspect of the present invention provides a method of creating a frame including an orthogonal frequency division multiplexing (OFDM) symbol generally used in a plurality of OFDM options, a maximum value among a repeated number of the same data by frequency domain spreading of the plurality of the OFDM options being $N_F$, the method including: determining a number of coded bits to be processed per $N_F$ OFDM symbols based on $N_F$ and a size of an interleaver, the number of coded bits corresponding to $N_{CBPS}$ and the size of the interleaver corresponding to $N_{cbps}$; determining a number of data bits to be processed per OFDM symbol based on $N_{CBPS}$ and a coding rate, the number of data bits corresponding to $N_{DBPS}$ and the coding rate corresponding to R; determining a number of padding bits based on $N_{DBPS}$, the number of padding bits corresponding to $N_{PAD}$; and generating a bit to be encoded by appending the $N_{PAD}$ padding bits to a physical layer header field.

Another aspect of the present invention also provides a method of creating a frame in which the same data is repeated $N_F$ times by frequency domain spreading, the method including: determining a number of coded bits to be processed per $N_F$ orthogonal frequency to division multiplexing (OFDM) symbols in the frame based on a size of an interleaver, the number of coded bits corresponding to $N_{CBPS}$ and the size of the interleaver corresponding to $N_{cbps}$; determining a number of data bits to be processed per $N_F$ OFDM symbols based on $N_{CBPS}$ and a coding rate, the number of data bits corresponding to $N_{DBPS}$ and the coding rate corresponding to R; determining a number of padding bits based on $N_{DBPS}$, the number of padding bits corresponding to $N_{PAD}$; and generating a bit to be encoded by appending the $N_{PAD}$ padding bits to a physical layer header field.

The method may further include further determining a number of the OFDM symbols in the frame based on $N_F$ and $N_{DBPS}$, the number of the OFDM symbols corresponding to $N_{SYM}$.

Still another aspect of the present invention also provides an orthogonal frequency division multiplexing (OFDM) transmitter including: an input bit generator to generate an input bit by appending a padding bit to a header bit; an encoder to encode the input bit and to output the encoded input bit; an interleaver to interleave the encoded input bit and to output the interleaved input bit; a subcarrier modulation mapper to convert the interleaved input bit into a carrier wave; a frequency domain spreading unit to apply frequency domain spreading to the converted carrier wave and to generate the frequency domain spread carrier wave; and an inverse fast Fourier transform unit to perform inverse Fourier transform on the frequency domain spread carrier wave and to generate an OFDM symbol, wherein a number of the padding bits $N_{PAD}$ is based on a size of the interleaver $N_{cbps}$, a frequency domain spreading multiple of the frequency domain spreading unit $N_F$, and a coding rate R of the encoder.

The header bit may be a physical layer header of an OFDM transmittance frame.

The subcarrier modulation mapper may convert the interleaved input bit into the carrier wave using at least one modulation schemes among a binary phase shift keying (BPSK), a quadrature phase shift keying (QPSK), a dual carrier modulation QPSK, and a 16-quadrature amplitude modulation (QAM).

As described above, embodiments of the present invention provide a method and an apparatus for creating a frame generally applied to various OFDM options including the IEEE 802.15.4g SUN specification.

Further, embodiments of the present invention provide a method and an apparatus for creating a frame which minimize formation of redundant OFDM symbols based on FDS facilitating realization of a low-power system and a size of an interleaving structure when transmittance information is short.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which:

FIG. 1 illustrates an orthogonal frequency division multiplexing (OFDM) option and data transmission according to an embodiment of the present invention;

FIG. 4 illustrates PSDU parameters used to form a frame when data to be transmitted has a length of 3 bytes according to an embodiment of the present invention;

FIG. 8 illustrates PSDU parameters used to form a frame when data to be transmitted has a length of 3 bytes according to an embodiment of the present invention;

FIG. 10 illustrates PSDU parameters used to form a frame when data to be transmitted has a length of 3 bytes according to an embodiment of the present invention.

DETAILED DESCRIPTION

Figure 2:
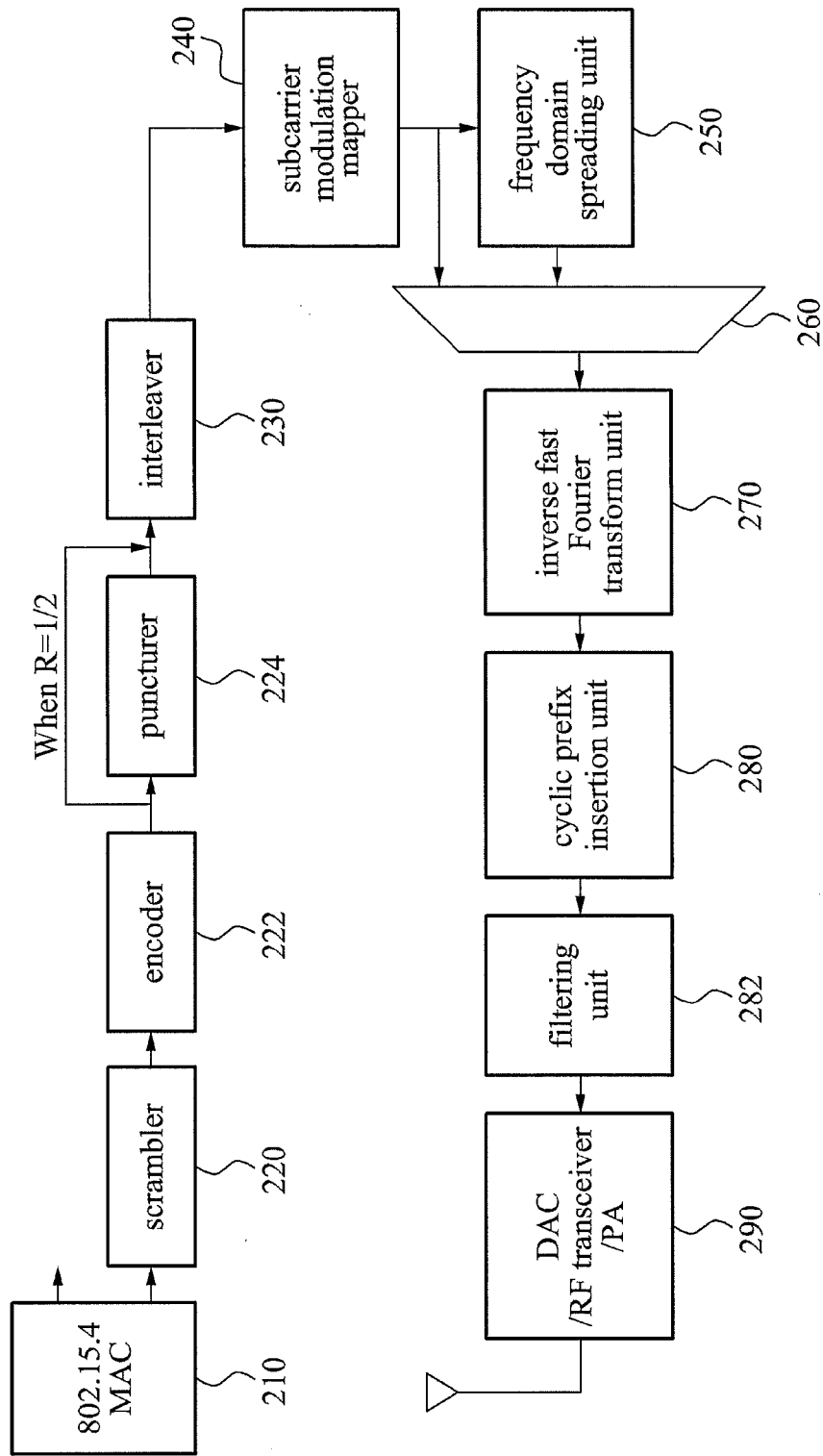
FIG. 2 illustrates a configuration of a transmitter using an OFDM transmission scheme according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

FIG. 1 illustrates an orthogonal frequency division multiplexing (OFDM) option and data transmission according to an embodiment of the present invention.

A table of FIG. 1 may be based on an Institute of Electrical and Electronics Engineers (IEEE) 802.15.4g Smart Utility Networks (SUN) specification.

As shown in second to sixth columns of the table, an OFDM system transmission specification for SUN includes five options depending on a size of a fast Fourier transform (FFT) in a second row. The options adjust a size of an FFT depending on conditions for use of unauthorized frequency bands in countries of the world to provide bandwidths of various frequencies.

Sixth to fourteenth rows of the table illustrate a modulation and coding scheme (MCS) according to a modulation scheme and a transmission rate.

As shown in the table, a modulation scheme includes a binary phase shift keying (BPSK), a quadrature phase shift keying (QPSK), a dual carrier modulation QPSK, and a 16-quadrature amplitude modulation (QAM), and a transmission rate includes 1/2 and 3/4.

Further, each option provides a different frequency domain spreading (FDS). That is, in a low data transmission mode of some options, a double or quadruple frequency spreading is used. Further, each option provides a different size of an interleaver. A size of an interleaver and an FDS have a close relation in constituting a frame.

Since the respective OFDM options have different FDSs, when a frame is created by a frame creating structure specializing in an option, the frame may not be properly formed in a different option or include a redundant symbol which is not directly associated with data transmission.

Thus, an embodiment of the present invention provides a method of creating a padding bit and a method of constituting a frame based on an FDS and a size of an interleaver generally applied to the OFDM options using various sizes of an FFT. The methods may be used as a physical layer (PHY) specification in the SUN.

A data bit conveyed by one OFDM symbol may be different on some options of the OFDM transmission method and an FDS used for a data transmission. A number of padding bits to be used for a frame and a number of OFDM symbols constituting the frame are determined based on characteristics of the data bit and a size of an interleaver.

In the embodiment of the present invention, a frame forming method adequate for a data transmission rate using the highest FDS is applied the same to a data transmission using a different FDS. Here, a frame may be formed in the same method, but a redundant OFDM symbol may be generated in the frame.

Another embodiment of the present invention provides a frame forming method in which a different frame forming method may be applied to a condition depending on use of an FDS, so that a redundant symbol is not generated.

FIG. 2 illustrates a configuration of a transmitter using an OFDM transmission scheme according to an embodiment of the present invention. An OFDM modulation diagram of FIG. 2 may be based on an IEEE 802.15.4g SUN specification.

The transmitter 200 may include a media access control (MAC) 210, a scrambler 220, an encoder 222, a puncturer 224, an interleaver 230, a subcarrier modulation mapper 240, an FDS unit 250, a multiplexer 260, an inverse fast Fourier transform (IFFT) unit 270, a cyclic prefix insertion unit 280, a filtering unit 282, and a digital-to-analog converter (DAC)/ radio frequency (RF) transceiver/power amplifier (PA) 290.

The MAC 210 refers to a media access control layer based on an 802.15.4 specification, and receives and outputs a signal to the scrambler 220.

The scrambler 220 scrambles and outputs the input signal.

The encoder 222 encodes the input signal. When the signal output by the encoder 220 does not have a transmission rate R of 1/2, the signal passes through the puncturer 224 and processed by the puncturer 224.

The interleaver 230 interleaves the input signal and outputs the interleaved signal.

The subcarrier modulation mapper 240 converts an input bit into a carrier wave and outputs the carrier wave.

The FDS unit 250 forms FDS before an interleaved bit by the interleaver 240 is input to the IFFT unit 270.

The FDS unit 250 inputs the same transmission data two or four times repeatedly to the IFFT unit 270 in a low data transmission mode in order to secure a high link margin in the OFDM transmission scheme.

The multiplexer 260 receives a signal from the subcarrier modulation mapper 240 and the FDS unit 250 and outputs a multiplexed signal.

The IFFT unit 270 performs inverse Fourier transform on the converted carrier wave and outputs a symbol.

A cyclic prefix is inserted into the output symbol by the cyclic prefix insertion unit 280, and the symbol is filtered by the filtering unit 282.

The filtered symbol is output through the DAC/RF transceiver/PA 290.

Figure 3:
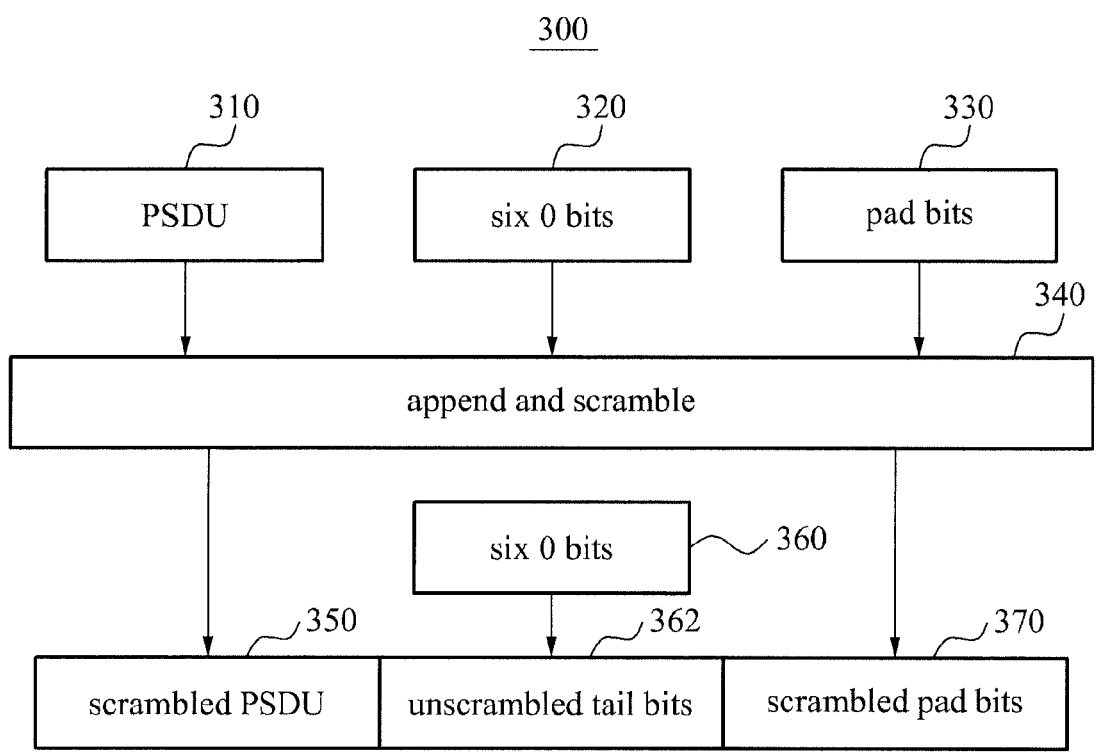
FIG. 3 is a block diagram illustrating a physical layer convergence procedure (PLCD) according to an embodiment of the present invention.

FIG. 3 is a block diagram illustrating a physical layer convergence procedure (PLCD) according to an embodiment of the present invention. A PLCD block 300 may be used for an OFDM scheme based on an IEEE 802.15.4g SUN specification.

In the PLCD block 300, an input value includes a PHY service data unit (PSDU) 310, six 0 bits that are tail bits 320, and padding bits 330.

The six 0 bits 320 and the padding bits 330 are appended to constitute a frame using a data length of the PSDU 310. The six 0 bits 320 is to initialize a convolutional code register.

The input values are appended and scrambled in operation 340 and generated into an output value.

The output value includes a scrambled PSDU 350, six 0 bits-appended unscrambled tail bits 362, and scrambled padding bits 370.

The following Equation 1 calculates a number of OFDM symbols and a number of padding bits to form a frame according to a length of data to be transmitted. The OFDM symbols are formed by a scheme which generally considers only an FDS, ignoring a size of an interleaver.

$$N_{SYM} = \text{ceil}((8*\text{LENGTH}+6)/N_{DBPS})$$

$$N_{DATA} = N_{SYM} * N_{DBPS}$$

$$N_{PAD} = N_{DATA} - (8*\text{LENGTH}+6) \quad \text{[Equation 1]}$$

Where, $N_{SYM}$ represents a number of symbols, a ceil function outputs a minimum integer number which is greater than or equal to a given argument, LENGTH represents a length of data to be transmitted. $N_{DBPS}$ represents a number of data bits to be processed per OFDM symbol by the IFFT unit 270 that is data bits/OFDM symbol at IFFT.

$N_{DATA}$ represents a number of bits in a frame, and $N_{PAD}$ represents a number of padding bits.

FIG. 4 illustrates PSDU parameters used to form a frame by Equation 1 when data to be transmitted has a length of 3 bytes according to an embodiment of the present invention. Rows of FIG. 4 illustrate OFDM options based on an IEEE 802.15.4g SUN specification in a first column and data transmission rates of the options in a second column.

That is, the above parameters are parameters when an OFDM symbol is formed based on only an FDS, ignoring a size of an interleaver.

Among the parameters, $N_{CBPS}$ represents a number of coded data bits per OFDM symbol by the IFFT unit 270 that is coded bits/OFDM symbol at IFFT.

As shown in FIG. 4, when the data to be transmitted has the length of 3 bytes, a number of OFDM symbols used to form a frame based on MCS0 of an option 1 and a number of padding bits to form the frame may be calculated by the following Equation 2.

$$N_{SYM} = \text{ceil}((8*3+6)/12) = 3$$

$$N_{DATA} = 3*12 = 36$$

$$N_{PAD} = 36 - (8*3+6) = 6 \quad \text{[Equation 2]}$$

As shown in Equation 2, six padding bits are appended to form a frame of three OFDM symbols.

Thirty data bits including the six padding bits pass through the convolutional encoder 222 having a coding rate R of 1/2 into 60 coded bits.

The 60 coded bits cannot create an interleaving structure constituting the MSC0 of the option 1 having an interleaver size of 96, which will be further described with reference to FIGS. 5 and 6.

The transmitter 200 using the OFDM transmission scheme uses the FDS unit 250 which inputs the same transmission data two or four times repeatedly to the IFFT unit 270 in order to obtain a high link margin. However, the transmitter 200 using the OFDM transmission scheme does not consider that data between data bits performing interleaving and data bits forming the OFDM symbols by the FDS unit 250 is repeated. Thus, the 60 coded bits cannot create an interleaving structure constituting the MSC0 of the option 1 having an interleaver size of 96.

Thus, in order to form a frame in an OFDM using an FDS, for example IEEE 802.15.4g SUN, a relation between a size of an interleaver and an FDS is considered.

An interleaving in the OFDM transmission scheme based on the IEEE 802.15.4g SUN specification is defined by the following Equation 3.

$$i = (N_{cbps}/N_{row})(k \bmod N_{row}) + \text{floor}(k/N_{row}), k=0, 1, 2, \ldots N_{CBPS}-1$$

$$j = s*\text{floor}(i/s) + (i+N_{cbps}-\text{floor}(N_{row}*i/N_{cbps})) \bmod s, \quad i=0, 1, 2, \ldots, N_{CBPS}$$

$$s = \max(N_{bpsc}/2, 1) \text{ where } N_{bpsc} => (\text{BPSK}=1, \text{QPSK}=2, 16 \text{ QAM}=4) \quad \text{[Equation 3]}$$

Here, a floor function returns a maximum integer value which is smaller than or equal to a argument, $N_{row}$ represents a size of a row of an interleaver array, and $N_{cbps}$ represents a number of coded bits per OFDM symbol at the interleaver 230 that is coded bits/OFDM symbol at interleaver. $N_{bpsc}$ is 1 in a BPSK, is 2 in a QPSK, and is 4 in a 16-QAM.

s is a number of bits to be parsed, i is an index of a stream where the interleaver operates, and j is an index subsequent to a second permutation.

When $N_{row}=12$ by Equation 3, $N_{cbps}=96*N_{bpsc}$ in the OFDM option 1, $N_{cbps}=48*N_{bpsc}$ in an OFDM option 2, $N_{cbps}=24*N_{bpsc}$ in an OFDM option 3, $N_{cbps}=12*N_{bpsc}$ in an OFDM option 4, and $N_{cbps}=4*N_{bpsc}$ in an OFDM option 5.

Figure 5:
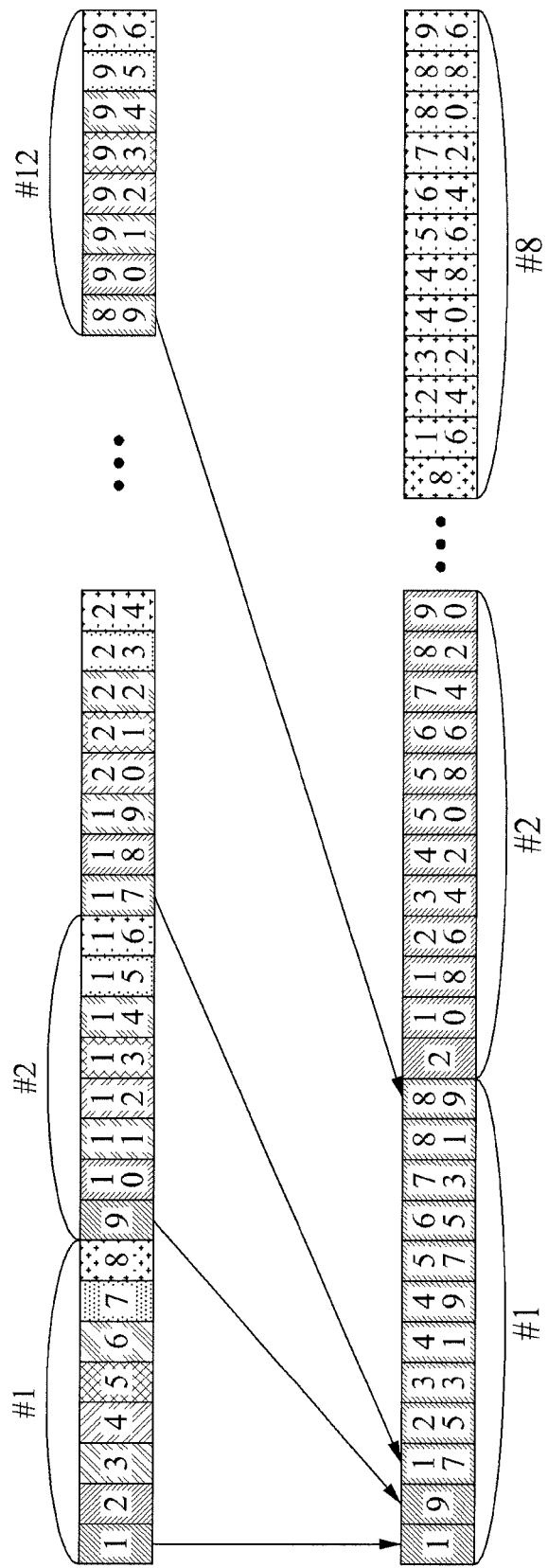
FIG. 5 illustrates an example of an interleaving when $N_{bpsc}$ is 1 in an option 1 based on an IEEE 802.15.4g SUN specification according to an embodiment of the present invention.

FIG. 5 illustrates an example of an interleaving when $N_{bpsc}$ is 1 in the option 1 based on the IEEE 802.15.4g SUN specification according to an embodiment of the present invention.

Since $N_{bpsc}$ is 1, the example of the interleaving shown in FIG. 5 uses a BPSK.

Upper rectangles represent bits before the interleaving, and lower rectangles represent bits after the interleaving. Numbers in the rectangles identify bits as shifting through the interleaving.

Figure 6:
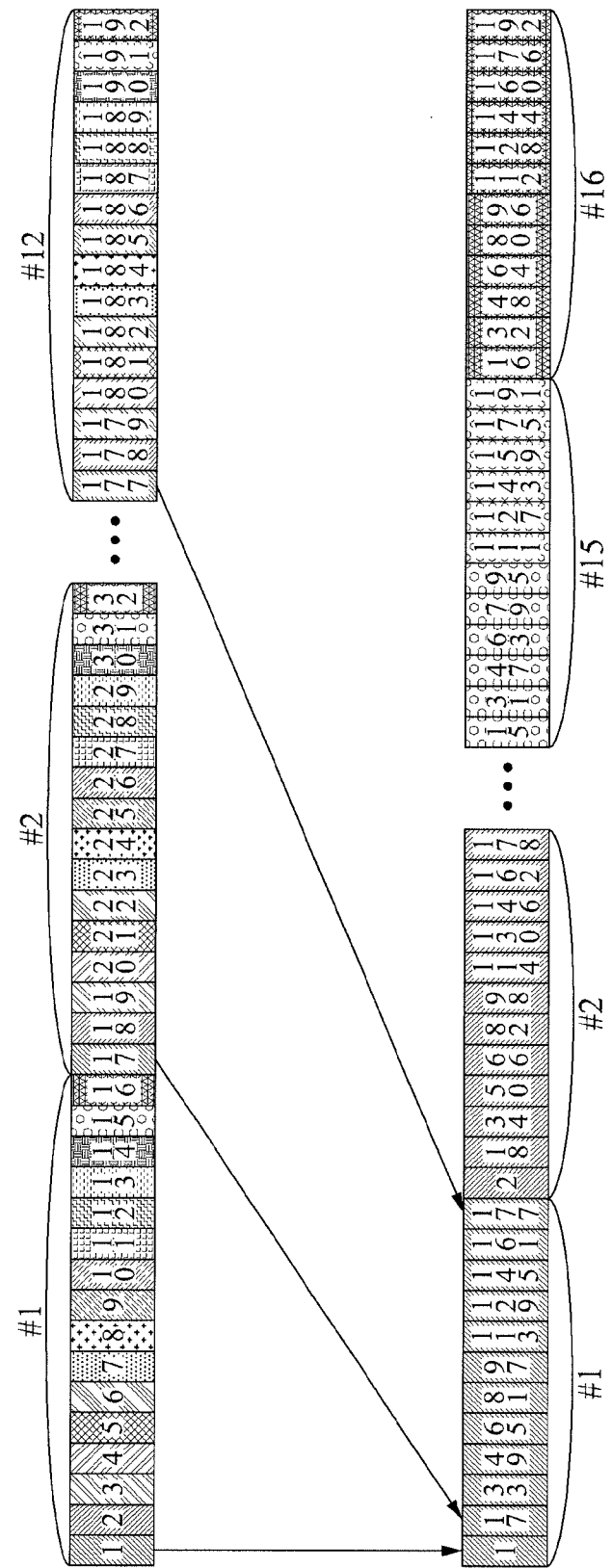
FIG. 6 illustrates an example of an interleaving when $N_{bpsc}$ is 2 in the option 1 based on the IEEE 802.15.4g SUN specification according to an embodiment of the present invention.

FIG. 6 illustrates an example of an interleaving when $N_{bpsc}$ is 2 in the option 1 based on the IEEE 802.15.4g SUN specification according to an embodiment of the present invention.

Since $N_{bpsc}$ is 2, the example of the interleaving shown in FIG. 6 uses a QPSK.

Upper rectangles represent bits before the interleaving, and lower rectangles represent bits after the interleaving. Numbers in the rectangles identify bits as shifting through the interleaving.

Figure 7:
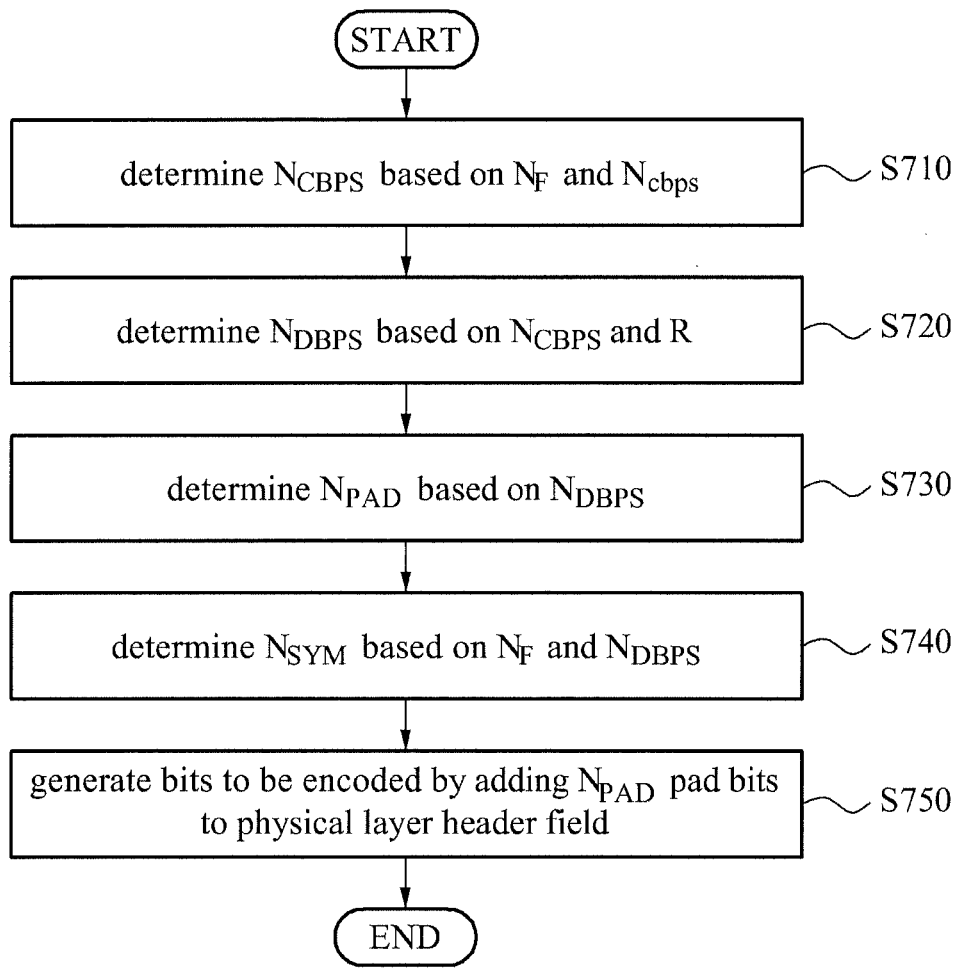
FIG. 7 is a flowchart illustrating a method of creating a frame according to an embodiment of the present invention.

FIG. 7 is a flowchart illustrating a method of creating a frame according to an embodiment of the present invention.

The method of creating the frame of the present embodiment may create a frame formed of OFDM symbols generally used in a plurality of OFDM options.

The following Equation 4 calculates a number of coded bits, a number of data bits, a number of padding bits, and a number OFDM symbols used to transmit a frame in order to form the frame according to a length of data to be transmitted. The frame is formed by a method based on a relation between an FDS and a size of an interleaver.

The frame may be adapted to a data transmission rate using a maximally quadruple FDS.

$$N_{CBPS} = \max(N_F, 1) * N_{cbps}/N_F$$

$$N_{DBPS} = N_{CBPS} * R$$

where, $R$=coding rate, $\max(N_F,1)=4$ $$N_{PAD} = N_{DBPS} * \text{ceil}((8*\text{LENGTH}+6)/N_{DBPS}) - (8*\text{LENGTH}+6)$$

$$N_{SYM} = \max(N_F,1) * \text{ceil}((8*\text{LENGTH}+6)/N_{DBPS}) \quad \text{[Equation 4]}$$

Here, $N_F$ represents a maximum number of a repeated number of the same data by the FDS unit 250 to be input to the IFFT unit 270. In Equation 4, $N_F$ is 4. A max function returns a value which is greater than or equal to a value among two arguments.

In operation S710, a number of coded bits ($N_{CBPS}$) to be processed per $N_F$ OFDM symbols is determined based on $N_F$ and a size of an interleaver ($N_{cbps}$).

In operation S720, a number of data bits ($N_{DBPS}$) to be processed per OFDM symbol is determined based on $N_{CBPS}$ and a coding rate (R).

In operation S730, a number of padding bits ($N_{PAD}$) is determined based on $N_{DBPS}$.

In operation S740, a number of OFDM symbols ($N_{SYM}$) in the frame is determined based on $N_F$ and $N_{DBPS}$.

In operation S750, a bit to be encoded is generated by adding the $N_{PAD}$ padding bits to a physical layer header field.

In operations S710, S720, S730, and S740, a method of determining $N_{CBPS}$, $N_{DBPS}$, $N_{DBPS}$, and $N_{SYM}$ is described above with reference to Equation 4.

FIG. 8 illustrates PSDU parameters used to form a frame by Equation 4 when data to be transmitted has a length of 3 bytes according to an embodiment of the present invention.

Rows of FIG. 8 illustrate OFDM options based on the IEEE 802.15.4g SUN specification in a first column and data transmission rates of the options in a second column.

Referring to Equation 4 and FIG. 8, when the data to be transmitted has the length of 3 bytes, a number of OFDM symbols used to form a frame based on the MCS0 of the option 1 and a number of padding bits to form the frame may be calculated by the following Equation 5.

$$N_{PAD} = 48 * \text{ceil}((8*3+6)/48) - (8*3+6) = 18$$

$$N_{SYM} = 4 * \text{ceil}((8*3+6)/48) = 4 \quad \text{[Equation 5]}$$

That is, 18 padding bits are appended to form a frame of total four OFDM symbols.

Here, 48 data bits including the 18 padding bits pass through the convolutional encoder 222 having a coding rate (R) of 1/2 into 96 coded bits.

The 96 coded bits create an interleaving structure forming the MSC0 of the option 1 having an interleaver size of 96 as described above with reference to Equation 3 and FIGS. 5 and 6.

There is a case where a frame is formed by a frame forming method adapted to a data transmission rate using a maximally quadruple FDS.

As described above regarding Equation 4, when the data to be transmitted has the length of 3 bytes, a number of OFDM symbols used to form a frame based on MCS4 of the option 1 and a number of padding bits to form the frame may be calculated by the following Equation 6.

$$N_{PAD} = 384 * \text{ceil}((8*3+6)/384) - (8*3+6) = 354$$

$$N_{SYM} = 4 * \text{ceil}((8*3+6)/384) = 4 \quad \text{[Equation 6]}$$

That is, 354 padding bits are appended to form a frame of total four OFDM symbols.

As illustrated in Equation 6, when a frame is formed adaptively to a data transmission rate using a maximum FDS, the same frame forming structure may be provided in all option modes and in all data transmission rates. However, in this structure, excessive padding bits are appended in a transmission rate not using an FDS and a redundant OFDM symbol is formed.

Figure 9:
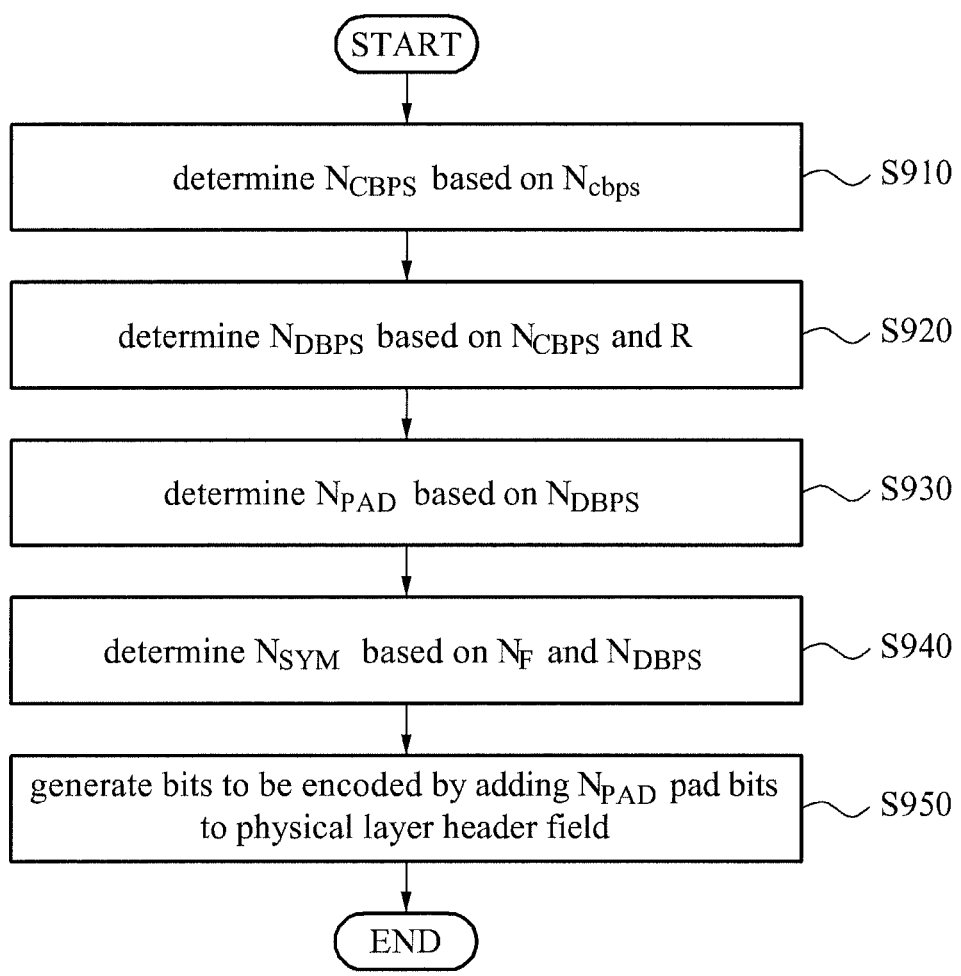
FIG. 9 is a flowchart illustrating a method of creating a frame according to an embodiment of the present invention.

FIG. 9 is a flowchart illustrating a method of creating a frame according to an embodiment of the present invention.

The following Equation 7 calculates a number of coded bits, a number of data bits, a number of padding bits, and a number OFDM symbols used to transmit a frame in order to form the frame using minimum OFDM symbols, that is where redundant symbols are minimized, adaptively to an FDS applied to a data transmission rate. The frame is formed by a method based on a relation between the FDS and a size of an interleaver, and is adapted to an FDS applied depending on a data transmission rate.

$$N_{CBPS} = N_{cbps}$$

$$N_{DBPS} = N_{CBPS} * R$$

where, $R$=coding rate $$N_{PAD} = N_{DBPS} * \text{ceil}((8*\text{LENGTH}+6)/N_{DBPS}) - (8*\text{LENGTH}+6)$$

$$N_{SYM} = N_F * \text{ceil}((8*\text{LENGTH}+6)/N_{DBPS}) \quad \text{[Equation 7]}$$

In operation S910, a number of coded bits ($N_{CBPS}$) to be processed per $N_F$ OFDM symbols in a frame is determined based on a size of an interleaver ($N_{cbps}$).

In operation S920, a number of data bits ($N_{DBPS}$) to be processed per OFDM symbol is determined based on $N_{CBPS}$ and a coding rate (R).

In operation S930, a number of padding bits ($N_{PAD}$) is determined based on $N_{DBPS}$.

In operation S940, a number of OFDM symbols ($N_{SYM}$) in the frame is determined based on $N_F$ and $N_{DBPS}$.

In operation S950, a bit to be encoded is generated by appending the $N_{PAD}$ padding bits to a physical layer header field.

In operations S910, S920, S930, and S940, a method of determining $N_{CBPS}$, $N_{DBPS}$, $N_{DBPS}$, and $N_{SYM}$ is described above with reference to Equation 7.

FIG. 10 illustrates PSDU parameters used to form a frame by Equation 7 when data to be transmitted has a length of 3 bytes according to an embodiment of the present invention.

Rows of FIG. 10 illustrate OFDM options based on the IEEE 802.15.4g SUN specification in a first column and data transmission rates of the options in a second column.

As described above regarding Equation 7, when the data to be transmitted has the length of 3 bytes, a number of OFDM symbols used to form a frame based on the MCS0 of the option 1 and a number of padding bits to form the frame may be calculated by the following Equation 8.

$$N_{PAD}=48*\text{ceil}((8*3+6)/48)-(8*3+6)=18$$

$$N_{SYM}=4*\text{ceil}((8*3+6)/48)=4 \quad \text{[Equation 8]}$$

That is, 18 padding bits are appended to form a frame of total four OFDM symbols.

Here, 48 data bits including the 18 padding bits pass through the convolutional encoder 222 having a coding rate (R) of 1/2 into 96 coded bits.

The 96 coded bits create an interleaving structure forming the MSC0 of the option 1 having an interleaver size of 96 as described above with reference to Equation 3 and FIGS. 5 and 6.

As described above regarding Equation 7, in a frame formed by a method using minimum OFDM symbols, that is where redundant symbols are minimized, adaptively to an FDS applied to a data transmission rate, when the data to be transmitted has the length of 3 bytes, a number of OFDM symbols used to form a frame based on MCS4 of the option 1 and a number of padding bits to form the frame may be calculated by the following Equation 9.

$$N_{PAD}=96*\text{ceil}((8*3+6)/96)-(8*3+6)=66$$

$$N_{SYM}=1*\text{ceil}((8*3+6)/96)=1 \quad \text{[Equation 9]}$$

That is, 66 padding bits are appended to form a frame of total one OFDM symbol.

As described above, a method of forming a frame using minimum OFDM symbols adaptively to an FDS applied to a data transmission rate does not generate a redundant symbol by appending minimum padding bits depending on whether an FDS is used or not based on a size of an interleaver. The method is suitable to form a low power system as data to be transmitted per frame is less.

Figure 11:
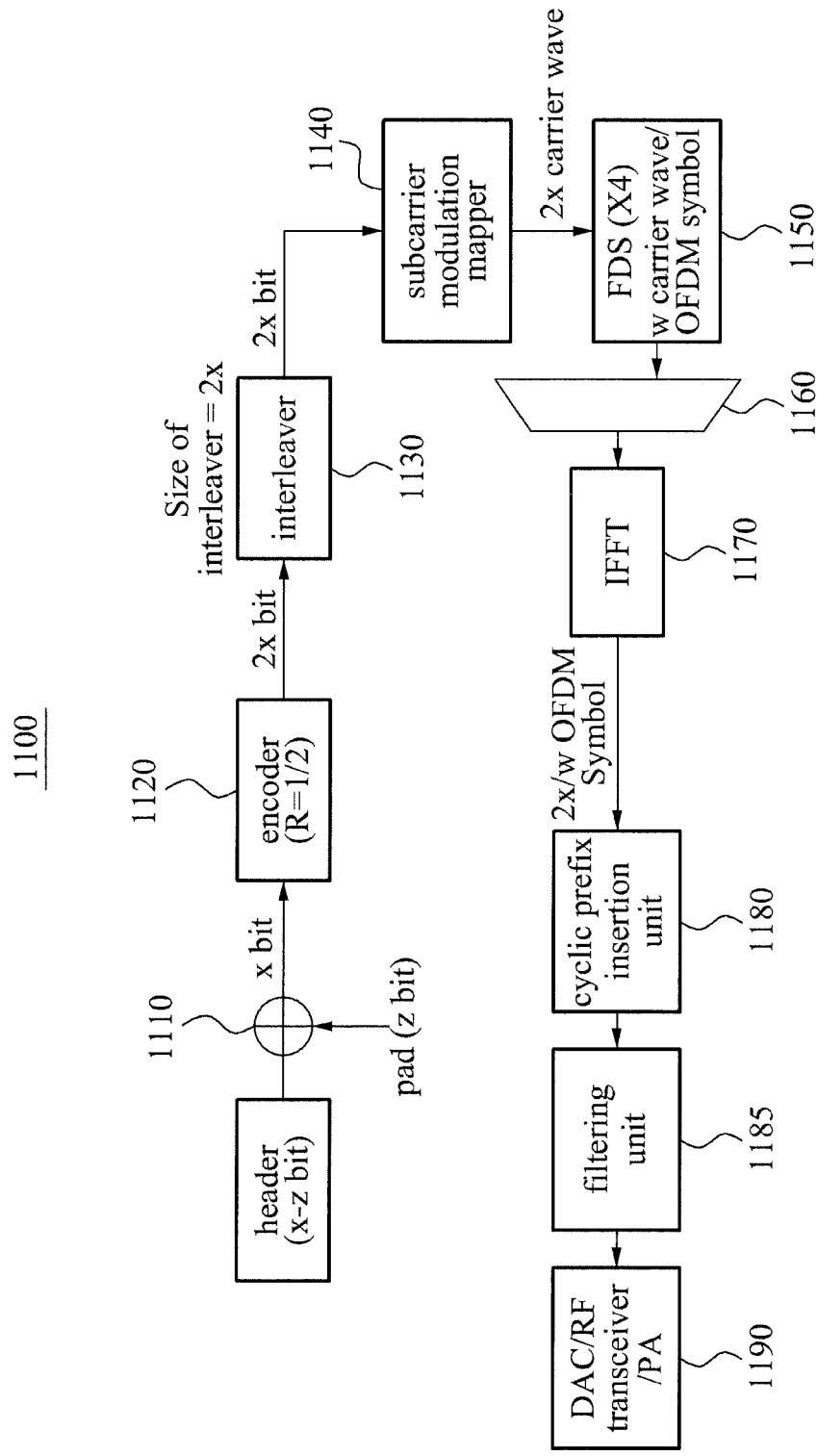
FIG. 11 illustrates a configuration of an OFDM transmitter according to an embodiment of the present invention.

FIG. 11 illustrates a configuration of an OFDM transmitter according to an embodiment of the present invention.

The OFDM transmitter 1100 includes an input bit generator 1110, an encoder 1120, an interleaver 1130, a subcarrier modulation mapper 1140, an FDS unit 1150, a multiplexer 1160, an IFFT unit 1170, a cyclic prefix insertion unit 1180, a filtering unit 1185, and a DAC/RF transceiver/PA 1190.

The input bit generator 1110 generates an input bit by appending a padding bit to a header bit.

The header bit may be a physical layer header of an OFDM transmission frame and be part of a bit stream.

A number of appended padding bits may be determined depending on the above-described different embodiments of the present invention.

For convenience, a number of input bits is x. That is, a number of the header bits is x-z, a number of padding bits is z, and the x input bits are generated by appending the two numbers together.

The encoder 1120 encodes the input bit and outputs the encoded input bit. In the present embodiment, the encoder 1120 has a coding rate (R) of 1/2. Thus, when a number of input bits is x, a number of encoded input bits is 2x.

The interleaver 1130 interleaves the encoded input bit and outputs the interleaved input bit. An example of interleaving is described above with reference to FIGS. 5 and 6. In the present embodiment, the interleaver 1130 may have a size of 2x, for example.

The subcarrier modulation mapper 1140 converts the interleaved input bit into a carrier wave and outputs the carrier wave. Since the number of input bits is 2x, a number of output carrier waves is 2x.

The FDS unit 1150 applies a frequency domain spreading to the converted carrier wave and outputs the frequency domain spread carrier wave. For example, the FDS unit 1150 applies a quadruple frequency spreading (×4). The FDS unit 1150 has a carrier wave per OFDM symbol (carriers/OFDM symbol) of w.

The multiplexer 1160 multiplexes the frequency domain spread carrier wave and a different signal (not shown) and outputs the frequency domain spread carrier wave and the signal.

The IFFT unit 1170 performs inverse Fourier transform on the frequency domain spread carrier wave and generates an OFDM symbol. As described above, since the carrier wave per OFDM symbol is w, a number of symbols output by the IFFT unit 1170 is 2x/w.

The output OFDM symbols are output by processing via the cyclic prefix insertion unit 1180, the filtering unit 1185, and the DAC/RF transceiver/PA 1190.

The description according to the above embodiments of the present invention made with reference to FIGS. 1 to 10 may be applied to the present invention. Repeated description is omitted hereinafter.

The encoder 1120, the interleaver 1130, the subcarrier modulation mapper 1140, the FDS unit 1150, the multiplexer 1160, the IFFT unit 1170, the cyclic prefix insertion unit 1180, the filtering unit 1185, and the DAC/RF transceiver/PA 1190 of the present embodiment correspond to the encoder 222, the interleaver 230, the subcarrier modulation mapper 240, the FDS unit 250, the multiplexer 260, the IFFT unit 270, the cyclic prefix insertion unit 280, the filtering unit 282, and the DAC/RF transceiver/PA 290 described above with reference to FIG. 2.

The above-described exemplary embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Although a few exemplary embodiments of the present invention have been shown and described, the present invention is not limited to the described exemplary embodiments. Instead, it would be appreciated by those skilled in the art that changes may be made to these to exemplary embodiments without departing from the principles and spirit of the invention, the scope of which is defined by the claims and their equivalents.

What is claimed is:

1. A method of creating a frame including an orthogonal frequency division multiplexing (OFDM) symbol generally used in a plurality of OFDM options, a maximum value among a repeated number of the same data by frequency domain spreading of the plurality of the OFDM options being $N_F$, the method comprising:

determining a number of coded bits to be processed per $N_F$ OFDM symbols based on $N_F$ and a size of an interleaver, the number of coded bits corresponding to $N_{CBPS}$ and the size of the interleaver corresponding to $N_{cbps}$;

determining a number of data bits to be processed per OFDM symbol based on $N_{CBPS}$ and a coding rate, the number of data bits corresponding to $N_{DBPS}$ and the coding rate corresponding to R;

determining a number of padding bits based on $N_{DBPS}$, the number of padding bits corresponding to $N_{PAD}$; and generating, executed by a computer, a bit to be encoded by appending the $N_{PAD}$ padding bits to a physical layer header field.

2. The method of claim 1, wherein $N_{CBPS}$, $N_{DBPS}$, and $N_{PAD}$ are determined by the following Equation 1, $$N_{CBPS} = \max(N_F, 1) * N_{cbps}/N_F$$

$$N_{DBPS} = N_{CBPS} * R$$

$$N_{PAD} = N_{DBPS} * \text{ceil}((8*\text{LENGTH}+6)/N_{DBPS}) - (8*\text{LENGTH}+6) \quad \text{[Equation 1]}$$

where, a max function returns a value which is greater than or equal to a value among two arguments, and a ceil function outputs a minimum integer number which is greater than or equal to a given argument.

3. The method of claim 1, further comprising determining a number of the OFDM symbols in the frame based on $N_F$ and $N_{DBPS}$, the number of the OFDM symbols corresponding to $N_{SYM}$.

4. The method of claim 3, wherein $N_{SYM}$ is determined by the following Equation 2, $$N_{SYM} = \max(N_F, 1) * \text{ceil}((8*\text{LENGTH}+6)/N_{DBPS}) \quad \text{[Equation 2]}$$

where, a max function returns a value which is greater than or equal to a value among two arguments, and a ceil function outputs a minimum integer number which is greater than or equal to a given argument.

5. A method of creating a frame in which the same data is repeated $N_F$ times by frequency domain spreading, the method comprising:

determining a number of coded bits to be processed per $N_F$ orthogonal frequency division multiplexing (OFDM) symbols in the frame based on a size of an interleaver, the number of coded bits corresponding to $N_{CBPS}$ and the size of the interleaver corresponding to $N_{cbps}$;

determining a number of data bits to be processed per $N_F$ OFDM symbols based on $N_{CBPS}$ and a coding rate, the number of data bits corresponding to $N_{DBPS}$ and the coding rate corresponding to R;

determining a number of padding bits based on $N_{DBPS}$, the number of padding bits corresponding to $N_{PAD}$; and generating, executed by a computer, a bit to be encoded by appending the $N_{PAD}$ padding bits to a physical layer header field.

6. The method of claim 5, wherein $N_{CBPS}$, $N_{DBPS}$, and $N_{PAD}$ are determined by the following Equation 3, $$N_{CBPS} = N_{cbps}$$

$$N_{DBPS} = N_{CBPS} * R$$

$$N_{PAD} = N_{DBPS} * \text{ceil}((8*\text{LENGTH}+6)/N_{DBPS}) - (8*\text{LENGTH}+6) \quad \text{[Equation 3]}$$

where, a ceil function outputs a minimum integer number that is greater than or equal to a argument.

7. The method of claim 5, further comprising determining a number of the OFDM symbols in the frame based on $N_F$ and $N_{DBPS}$, the number of the OFDM symbols corresponding to $N_{SYM}$.

8. The method of claim 7, wherein $N_{SYM}$ is determined by the following Equation 4, $$N_{SYM} = N_F * \text{ceil}((8*\text{LENGTH}+6)/N_{DBPS}) \quad \text{[Equation 4]}$$

where, a ceil function outputs a minimum integer number that is greater than or equal to a given argument.

9. An orthogonal frequency division multiplexing (OFDM) transmitter comprising:

an input bit generator to generate an input bit by appending a padding bit to a header bit;

an encoder to encode the input bit and to output the encoded input bit;

an interleaver to interleave the encoded input bit and to output the interleaved input bit;

a subcarrier modulation mapper to convert the interleaved input bit into a carrier wave;

a frequency domain spreading unit to apply frequency domain spreading to the converted carrier wave and to generate the frequency domain spread carrier wave; and an inverse fast Fourier transform unit to perform inverse Fourier transform on the frequency domain spread carrier wave and to generate an OFDM symbol, wherein a number of the padding bits $N_{PAD}$ is based on a size of the interleaver $N_{cbps}$, a frequency domain spreading multiple of the frequency domain spreading unit $N_F$, and a coding rate R of the encoder.

10. The OFDM transmitter of claim 9, wherein $N_{PAD}$ is determined by the following Equation 5, $$N_{CBPS} = \max(N_F, 1) * N_{cbps}/N_F$$

$$N_{DBPS} = N_{CBPS} * R$$

$$N_{PAD} = N_{DBPS} * \text{ceil}((8*\text{LENGTH}+6)/N_{DBPS}) - (8*\text{LENGTH}+6) \quad \text{[Equation 5]}$$

where, a max function returns a value which is greater than or equal to a value among two arguments, and a ceil function outputs a minimum integer number which is greater than or equal to a given argument.

11. The OFDM transmitter of claim 9, wherein $N_{PAD}$ is determined by the following Equation 6, $$N_{CBPS} = N_{cbps}$$

$$N_{DBPS} = N_{CBPS} * R$$

$$N_{PAD} = N_{DBPS} * \text{ceil}((8*\text{LENGTH}+6)/N_{DBPS}) - (8*\text{LENGTH}+6) \quad \text{[Equation 6]}$$

where, a ceil function outputs a minimum integer number which is greater than or equal to a given argument.

12. The OFDM transmitter of claim 9, wherein the header bit is a physical layer header of an OFDM transmittance frame.

13. The OFDM transmitter of claim 9, wherein the subcarrier modulation mapper converts the interleaved input bit into the carrier wave using at least one modulation schemes among a binary phase shift keying (BPSK), a quadrature phase shift keying (QPSK), a dual carrier modulation QPSK, and a 16-quadrature amplitude modulation (QAM).

\* \* \* \* \*